US006479833B1

(12) United States Patent
Pfefferseder et al.

(10) Patent No.: US 6,479,833 B1
(45) Date of Patent: Nov. 12, 2002

(54) FIRE ALARM BOX WITH DIRECT AND SCATTERED LIGHT DETECTION AND GAS-SENSITIVE LAYERS

(75) Inventors: Anton Pfefferseder, Sauerlach-Arget; Andreas Hensel, Vaihingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,668

(22) PCT Filed: Sep. 17, 1998

(86) PCT No.: PCT/DE98/02750

§ 371 (c)(1), (2), (4) Date: Apr. 6, 2001

(87) PCT Pub. No.: WO99/45515

PCT Pub. Date: Sep. 10, 1999

(30) Foreign Application Priority Data

Mar. 7, 1998 (DE) ........................................ 198 09 896

(51) Int. Cl.[7] ........................ G01N 15/06; G01N 21/49; G01N 21/85

(52) U.S. Cl. ....................................... 250/573; 356/437

(58) Field of Search ................................ 356/436, 437, 356/438, 337, 338, 339, 340, 336; 250/573, 574, 575, 214 R; 422/82.06, 82.09, 83, 86

(56) References Cited

U.S. PATENT DOCUMENTS 3,754,867 A * 8/1973 Guenther .................. 23/254 R
3,922,656 A 11/1975 Horvath et al. .......... 340/237 S
4,677,078 A * 6/1987 Minten et al. .............. 436/136
4,752,447 A * 6/1988 Kimmel et al. ................ 422/56
4,857,895 A 8/1989 Kaprelian et al. .......... 340/630
5,218,212 A * 6/1993 Sato et al. .................. 250/573
5,352,901 A 10/1994 Poorman et al. ............ 250/574
5,691,465 A * 11/1997 Carr et al. ................. 73/24.02
6,230,545 B1 * 5/2001 Adolph et al. ............ 73/31.05

FOREIGN PATENT DOCUMENTS

GB 2 314 618 1/1998

OTHER PUBLICATIONS

Brenci et al.; An Optical Fiber Sensor System for Fire Detection in Hazardous Environments; Dec. 1993; pp. 183–190.*

* cited by examiner

*Primary Examiner*—Stephone Allen
*Assistant Examiner*—Christopher W. Glass
(74) *Attorney, Agent, or Firm*—Kenyon & Kenyon

(57) ABSTRACT

A fire detector for detecting gaseous and dust-like combustion products, having at least one optical transmitter and at least two optical receivers for in each case outputting an electrical signal to a downstream evaluation unit. At least one of the optical receivers is disposed outside of a direct radiation range of the optical transmitter and acts as a scattered-light receiver, and a gas-sensitive layer is interposed in advance of at least one further optical receiver disposed in a direct radiation range of the optical transmitter this layer preferably absorbing light components of a specific narrow wavelength range in response to a contact with a specific gas.

7 Claims, 2 Drawing Sheets

FIRE ALARM BOX WITH DIRECT AND SCATTERED LIGHT DETECTION AND GAS-SENSITIVE LAYERS

BACKGROUND INFORMATION

Smoke detectors are generally used for the early detection of fires. Optical fire detectors are among the most frequently used detectors in the field of fire detection. They can be designed as transmitted-light detectors or as scattered-light detectors. Smoke detectors based on the scattered-radiation principle detect smoke particles by measuring radiation scattered on these smoke particles. The response characteristic, i.e. the sensitivity of all optical smoke detectors, is strongly dependent on the type of fire. The amount, the nature and the composition of the smoke produced by the fire play a large role for the sensitivity of the smoke detector. Fires with low smoke production cannot be detected as well as fires in which a great deal of smoke is produced. In addition, scattered-light smoke detectors have to rely on the circumstance that light will be reflected on the smoke particles. To achieve a more uniform response characteristic of fire detectors, optical smoke detectors can be combined with detectors based on other principles. For example, ionization smoke detectors or temperature detectors are known. These different types of fire detectors can be mounted at different locations in an area, or can even be integrated in a single detector.

Such combinations of optical smoke detectors with temperature detectors or ionization smoke detectors are known. In addition to an increase in temperature and the development of smoke, the appearance of gaseous combustion products is a further significant feature for fire detection. These combustion products can be detected by various types of gas sensors. An object of the present invention is to provide a fire detector which can reliably detect various types of fires, with and without smoke production.

SUMMARY OF THE INVENTION

The fire detector of the present invention offers the advantage that the combination of two different sensor methods permits more reliable fire detection than is the case with conventional smoke or fire detectors. Thus, a generally known scattered-light receiver for detecting smoke is combined with at least one further optical receiver which, due to the interposition of a gas-sensitive layer, reacts to specific constituents in the air which typically develop during the combustion. By using a shared light source as optical transmitter, the fire detector can have a very compact and space-saving design. The signal processing of a downstream evaluation unit is also simplified. Furthermore, it is generally sufficient to provide only one such fire detector per area, if the area does not exceed a certain size, instead of several smoke detectors operating on different measuring principles, which considerably simplifies installation and cabling. Additionally, the optical receivers located in the direct radiation range of the optical transmitter can act as transmitted-light smoke detectors, and are thus able to register brightness variations because of aerosols present in the air. This is advantageously permitted by an evaluation unit which is connected downstream of the optical receiver and which evaluates fluctuations of the electrical signal because of fluctuations in the brightness of the received light signal. In so doing, known methods such as modulated measurement or lock-in technique are used.

DETAILED DESCRIPTION

Figure 1:
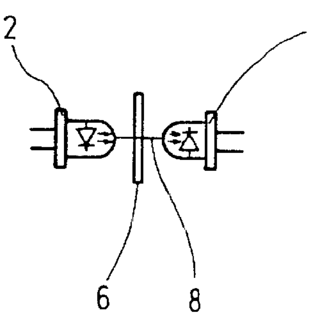
FIG. 1 shows an arrangement of a gas-sensitive layer between an optical transmitter and an optical receiver.

FIG. 1 shows an exemplary measuring arrangement including an optical transmitter 2 such as an infrared light-emitting diode, and an optical receiver 4, e.g., a photodiode, which is sensitive to infrared light. Such components permit small, compact and inexpensive fire detectors which, in addition, operate with very little energy. However, optical transmitters 2 and receivers 4 which function with light in the visible wavelength range can also be used just as well. The tuning between the wavelength of the light emitted by optical transmitter 2 and the absorbed wavelength of a gas-sensitive layer 6, described in the following, is decisive for the functioning of the measuring arrangement. Located between optical transmitter 2 and optical receiver 4, which is mounted at a certain distance in direct ray path 8 of the transmitter, is a layer 6 which is permeable for the radiation of optical transmitter 2 and is made, for example, from a carrier of polymer material which is provided with a specific gas-sensitive coating. This layer 6, permeable for the light emitted by optical transmitter 2, can be situated precisely in the middle between optical transmitter 2 and optical receiver 4, but it is equally possible to arrange it at any position between optical transmitter 2 and optical receiver 4, provided it is located in ray path 8. In response to interaction with certain gases, generally known gas-sensitive layer 6 is able to partially absorb a light of specific wavelength emitted by optical transmitter 2. Gas-sensitive layer 6 contains an indicator substance which is sensitive to a specific gas and is calibrated by previous calibration measurements prior to installation. As soon as the gas to be detected enters into the area between optical transmitter 2 and optical receiver 4, the indicator substance contained in layer 6 changes its absorption for specific wavelength ranges of the electromagnetic radiation striking it. Since this wavelength corresponds to a local absorption maximum of the indicator substance, optical receiver 4 arranged downstream of layer 6 registers an altered transmission. The level of the absorption maximum, and thus the magnitude of the transmission are proportional to the concentration of the gas. This can be determined by an evaluation unit 100 as shown by way of example in FIG. 4, and, given an application as smoke detector, can be connected to a signal generator.

Figure 2:
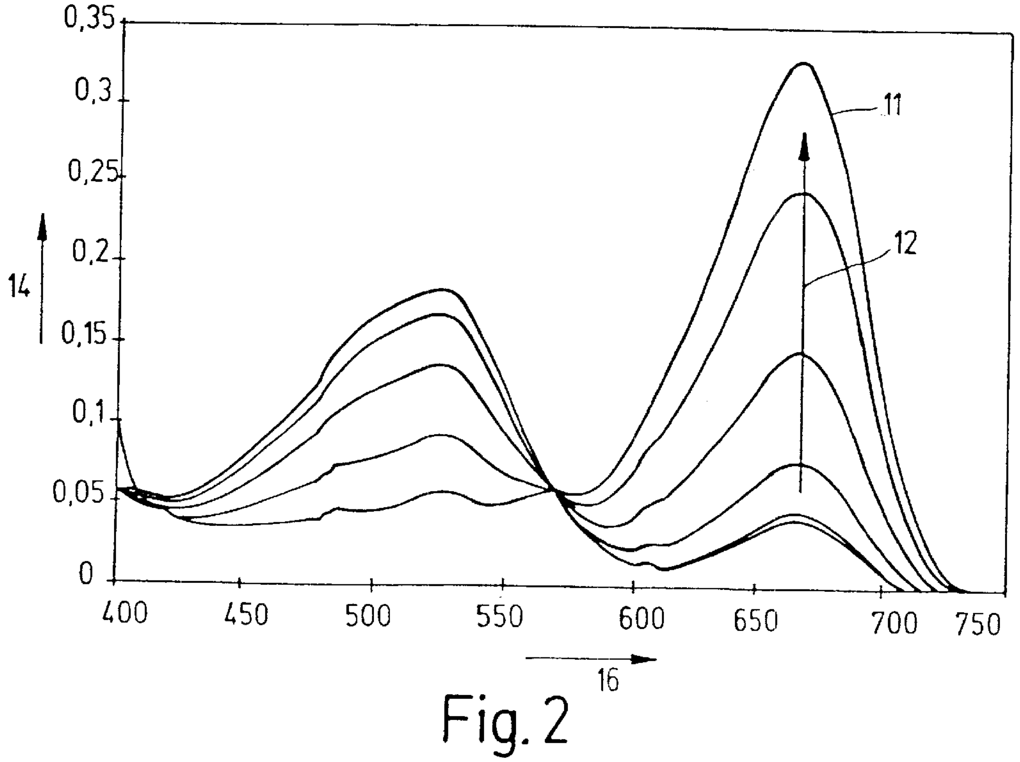
FIG. 2 shows an absorption spectrum of a layer sensitive to NO or $NO_2$.

FIG. 2 shows, by way of example, a diagram of a correlation between the wavelength and the absorption of light of a gas-sensitive layer in response to different concentrations of a gas mixture coming into contact with the gas-sensitive layer. Wavelength $\lambda$ of the light emitted by the optical transmitter is plotted in nanometers (nm) on horizontal axis 16 of the diagram. A relative absorption value which, given complete absorption, would assume a value of 1.0, is plotted on vertical axis 14. For example, in FIG. 2, the gas-sensitive layer is a layer sensitive to NO and/or $NO_2$. It is discernible that at a specific light wavelength, at approximately 670 nm in the example shown, the absorption of light exhibits a perceptible maximum in response to rising NO concentration. Several curves 11 are plotted whose maximum increases in each case in response to rising NO concentration. This increase is indicated by an upward-pointing arrow 12. The sensor effect, i.e. the absorption or transmission changes, can generally be established in relatively narrow wavelength ranges for the gas-sensitive layers used. Certain polymers which are largely chemically inert are suitable as carriers for such gas-sensitive layers, thus ensuring that only the indicator substance interacts with the gas. This indicator substance is applied onto the polymer and exhibits an interaction with certain gases. Furthermore, this measuring method makes it possible to provide a plurality of optical receivers, each having different gas-sensitive layers, and in this way to present combined smoke detectors which function in response to a multitude of different gases.

Figure 3:
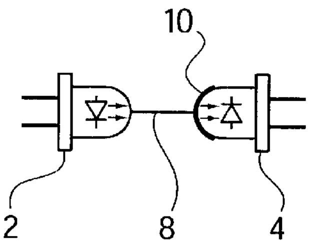
FIG. 3 shows a measuring arrangement with a gas-sensitive layer on the optical receiver.

FIG. 3 shows an alternative measuring arrangement in which a gas-sensitive layer 10 is applied directly on optical receiver 4, a light-sensitive photodiode in the exemplary embodiment shown. The same parts as in the preceding figures are provided with the same reference numerals and are not explained again. Such a measuring arrangement has the advantage that, with these means, very compact smoke or combustion-gas detectors can be presented. To detect various gaseous combustion products, a plurality of optical receivers 4 can have layers 10, each sensitive to different gases. They can all be arranged in ray path 8 of optical transmitter 2 at a specific distance from said sensor, and are therefore able to supply various characteristic absorption signals for various combustion gases to an evaluation unit, not shown here.

Figure 4:
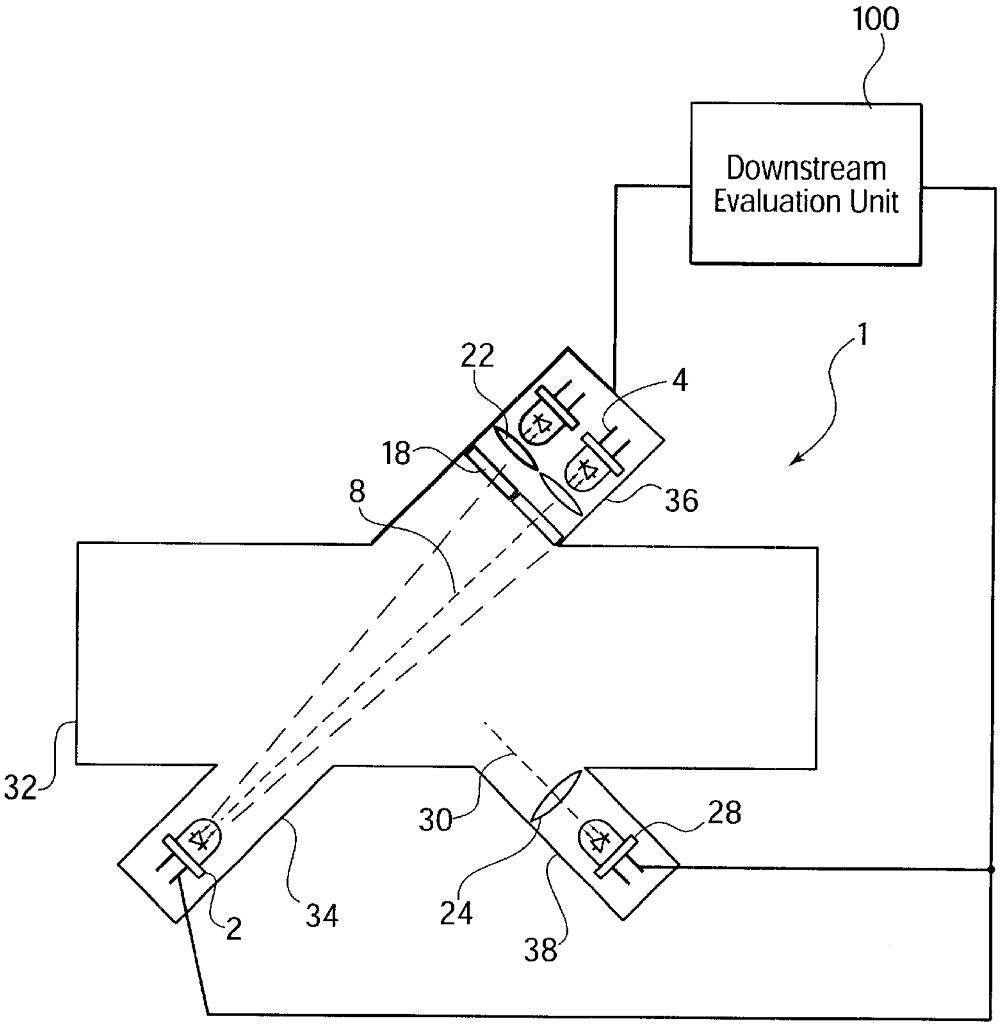
FIG. 4 shows a design of a combined fire detector.

Finally, FIG. 4 shows a design of a combined fire detector 1 which, in addition to an optical transmitter 2, has an optical receiver 28 functioning as a scattered-light sensor and at least one optical receiver 4 functioning as a gas sensor. The same parts as in the previous figures are provided with the same reference numerals and are not explained again. Because of the utilized wavelength range of the light emitted by optical transmitter 2, a shared light source, here, for example, an infrared light-emitting diode, can be used for both detection methods. Fire detector 1 is composed essentially of a chamber 32 which is designed in such a way that no light, or only little light can penetrate from the outside, and at the same time smoke and gaseous combustion products have the greatest possible unhindered access. As is customary in the case of scattered-light detectors, this can be implemented in the form of an optical labyrinth, not shown here. Set into the wall are a plurality of accommodations 34, 36, 38, closed to the outside, for optical transmitter 2 and optical receivers 4, 28. Chamber 32 is open toward at least one end face, so that sensors are in contact with the atmosphere in the chamber and combustion gases or smoke contained therein. The outer wall of chamber 32 is made preferably of material impervious to light, so that no false influences due to incident scattered light can occur during the measurements. Accommodations 34, 36, 38 for optical transmitter 2 and optical receivers 4, 28 are preferably so deep that optical transmitter 2 is only able to radiate with a narrow light-exit cone, and further so deep that no scattered light falling into the end faces of chamber 32 can impinge upon optical receivers 4, 28. Optical axis 8 of the light-exit cone of optical transmitter 2 is preferably disposed at an oblique angle of, for example, 45° to the longitudinal axis of chamber 32. Optical receiver 28 for the scattered-light sensor, here, for example, a photodiode, is preferably so arranged that it does not lie in the direct radiation range 8 of optical transmitter 2, and therefore can only receive scattered light. Thus, an optical axis 30 of optical receiver 28 can likewise be disposed at an angle of, e.g., 45° to the longitudinal axis of tube 32, so that optical axes 8 and 30 intersect at a specific point on the longitudinal axis of tube 32 at an angle of, for example, 900. Therefore, optical receiver 28 functions in conjunction with optical transmitter 2 like a conventional scattered-light smoke detector. At least one further optical receiver 4 is disposed in a further accommodation 36 whose longitudinal extension is aligned in the same direction as accommodation 34 for optical transmitter 2. Consequently, optical receiver 4 lies in the direct radiation range of optical transmitter 2, and is therefore preferably suited for detecting combustion gases which are not detectable for the scattered-light sensor. For this purpose, a carrier having a gas-sensitive layer 18 for absorbing specific light components as a function of gas concentrations contained in the air is placed in front of optical receiver 4. To concentrate the light received by optical receivers 4, 28, convergent lenses 22, 24 are preferably interposed in advance of said receivers and focus the light falling into accommodations 36, 38 exactly onto the light-sensitive point of optical receivers 4, 28. A plurality of optical receivers 4, each having different gas-sensitive layers placed in front of them, can be provided in a fire detector 1. This makes it possible to detect various gaseous combustion products. In certain fire situations where no gases develop to which the gas-sensitive layers could respond, the scattered-light sensor is nevertheless able to trigger an alarm.

As a further function possibility of the fire detector, the subduing of light by aerosols contained in the combustion air can be measured and drawn upon as an alarm criterion. Given constant brightness of the light radiated by optical transmitter 2, the electrical signal emitted by optical receiver 4 is likewise constant. In response to a lessening of brightness due to aerosols contained in the air to which gas-sensitive layer 18 does not respond by a partial absorption, the signal emitted by optical receiver 4 nevertheless becomes weaker, which can be evaluated as a further criterion for a possible fire.

What is claimed is:

1. A fire detector for detecting at least one of gaseous and dust-like combustion products, comprising:

at least one optical recognition device, the at least one optical recognition device generating a signal as a function of at least one of physical and chemical parameters of the combustion products and transmitting the signal to a downstream evaluation unit, the at least one optical recognition device including at least one optical transmitter and at least two optical receivers, the at least two optical receivers including a first optical receiver and a second optical receiver, the first optical receiver being situated outside of a direct radiation range of the at least one optical transmitter and acting as a scattered-light receiver, the second optical receiver being situated in the direct radiation range of the at least one optical transmitter, the at least one optical recognition device further including a gas-sensitive layer interposed in advance of the second optical receiver.

2. The fire detector according to claim 1, wherein the layer absorbs light components of a predetermined wavelength range in response to a contact with a predetermined gas.

3. The fire detector according to claim 1, wherein the optical recognition device includes a plurality of second optical receivers situated in the direct radiation range of the optical transmitter, the optical recognition device further including a plurality of layers sensitive to different gases, each of the plurality of layers being interposed in advance of a respective one of the plurality of second optical receivers.

4. The fire detector according to claim 1, wherein the optical recognition device includes at least two optical systems, each of the optical systems being interposed in advance of a respective one of the optical receivers.

5. The fire detector according to claim 1, wherein a signal received from the second optical receiver is evaluated as that of a transmitted-light smoke detector.

6. The fire detector according to claim 1, wherein the evaluation unit evaluates brightness variations due to aerosols in the direct radiation range and is situated downstream of the second optical receiver.

7. The fire detector according to claim 1, wherein the optical transmitter and the optical receivers are situated in a common housing which is permeable for air and impermeable for light.

* * * * *